UNITED STATES PATENT OFFICE.

KARL P. McELROY, OF WASHINGTON, DISTRICT OF COLUMBIA, ASSIGNOR TO CHEMICAL DEVELOPMENT COMPANY, A CORPORATION OF MAINE.

MANUFACTURE OF GLYCOLS AND GLYCOL DERIVATIVES.

1,259,758.  Specification of Letters Patent.  Patented Mar. 19, 1918.

No Drawing.  Application filed March 29, 1913. Serial No. 757,582.

*To all whom it may concern:*

Be it known that I, KARL P. McELROY, a citizen of the United States, residing at Washington, in the District of Columbia, have invented certain new and useful Improvements in the Manufacture of Glycols and Glycol Derivatives, of which the following is a specification.

This invention relates to the manufacture of glycols and glycol derivatives; and it comprises a process wherein a dihalid of an olefin is heated under pressure with a liquid comprising water and a salt of calcium with a weak acid; all as more fully hereinafter set forth and as claimed.

The glycols and the various glycol derivatives, such as the acetates, are bodies possessed of properties adapted to make them useful in the arts, but no cheap and efficient method of producing them is in use. It is comparatively easy to produce dihalids by direct reaction of bromin or chlorin on the double bond hydrocarbons or olefins, and these dihalids possess in some respects the properties of esters of glycols. But saponification of these dihalids is quite difficult and it is still more difficult to obtain good yields of the saponified products, the glycols. This is for a variety of reasons, one being that the reaction of the dihalids with alkali hydroxids in lieu of being, as might be expected, a direct substitution of hydroxyl for halogen is apt to take another course and result in the withdrawal of hydrogen and one atom of halogen with formation of an unsaturated compound. Ethylene, for example, easily unites directly with bromin or chlorin to form a dihalid, but this dihalid on treatment with KOH or NaOH gives the corresponding vinyl derivatives in greater or less proportion. Potassium carbonate works better than the hydroxids but must be used in dilute solution and the yield for this reason (glycol being quite volatile with water vapors) and because of the formation of some amount of vinyl compounds, is always very poor. A further inconvenience in the potassium carbonate method arises from the fact that potassum chlorid or bromid crystallizes out of the mother liquors on concentration of the resulting glycol solutions and makes the material inconvenient to handle.

For the stated reasons, in the laboratory production of glycols (these bodies are not made commercially) it is usual to employ an indirect method of production, that of first making an acetate from the dihalid (usually the bromid) with an alcoholic solution of potassium acetate and then saponifying this acetate to make a glycol.

I have discovered that a cheaper, better and more productive treatment of these dihalids to obtain useful products is to employ calcium salts of weak acids in the presence of a limited amount of water and at a rather high temperature. By so doing I secure a number of simultaneous advantages. Lime is not as strong a base as soda or potash and does not have the same tendency to form unsaturated compounds; nor do its salts dissociate in solution to form free alkali to the same extent. The dissociation of potassium carbonate solution in the usual direct method is presumed to be responsible for the formation of vinyl compounds. On treating an olefin bromid or chlorid with a lime salt one product of the reaction is of course the corresponding calcium halid; and both the chlorid and the bromid of calcium are readily soluble, hygroscopic salts forming solutions with water which retain their fluidity even at relatively high temperatures. There is not therefore the necessity, as with potassium and sodium salts, of removing crops of crystals from time to time. Permanently fluid reaction mixtures, from which glycols or their esters may be easily recovered, may be made without the use of undue amounts of water.

By operating under pressure at temperatures of, say, 100° C. to 150° C. in a closed container the usual difficulty of slowness of reaction disappears and furthermore it is not necessary to employ a solvent of olefin halid, such as alcohol, to keep such halid in the sphere of reaction. Alcohol may be used in the present invention and is useful; but it may also be dispensed with.

While either a dibromid or a dichlorid may be used in the present invention, in practice I prefer the dichlorids both because of the less bulk and because calcium chlorid is a better component of the final reaction mixture than is calcium bromid.

Though other calcium salts of weak acids may be employed, I prefer the carbonate or the acetate; the former when making glycols direct and the latter when making the glycol acetates. With carbonates, the evolution of $CO_2$ causes extra pressure with the reaction vessel which may therefore be provided with venting means leading through a condenser.

The present process may be employed with any olefin dihalid from any source. It may, for example, be used in converting ethylene dichlorid ("Dutch liquid") or dibromid into glycol or into ethylene acetates. The ethylene used in making the dihalid may be made from alcohol or from acetylene. Propylene, butylene, etc., halids may be converted in a similar way. Various liquid olefins, such as are contained in petroleum or such products as "cracked gasolenes," may first be chlorinated or brominated and then treated in the present manner. I regard it however as particularly adapted to the treatment of olefin chlorids made from gasified petroleum oils. By exposing vapors of heavy crude petroleum, or of heavy still residua, such as fuel oils, to a temperature around 700° C. for a brief time they may be cracked down into gases carrying 40 to 70 per cent. total olefins, mainly ethylene and propylene. Often there is about twice as much ethylene as propylene. Such a gas after freeing of condensable bodies, on direct treatment with chlorin yields a mixture of dichlorids which may be treated by the present process to yield mixtures of glycols or glycol derivatives which are of advantageous properties. Of course the dichlorids may be fractionated into ethylene, propylene, etc., dichlorids, and these then separately treated; but the usual mixture of olefins of such oil gas gives a mixture of chlorids which in turn gives glycol mixtures of advantageous properties.

In one specific embodiment of my invention, I may take such a mixture of chlorids formed from a petroleum gas and place it in any suitable container capable of withstanding heat and pressure. To the chlorids I may add about an equal amount of fine powdered calcium carbonate and at least enough water to make a pulpy mass. The container is now closed and an agitator set in motion. Agitation should be active. The mixture is now heated up to, say, 115° to 130° C. for a period of, say, two or three hours, or longer. As the reaction produces $CO_2$ some gas may be vented off from time to time, the venting being best through a reflux condenser and past an ordinary condenser to prevent escape of as much volatiles as possible from the container and to recover those vapors which are vented off with the gas. As these chlorids are quite volatile, some are apt to escape in this venting off, going past the reflux. It is advantageous to keep as much $CO_2$ pressure in the container as is convenient, in addition to the steam pressure corresponding to the heat as this facilitates and quickens the reaction as well as obviating any tendency toward the vinyl producing reaction alluded to. The $CO_2$ makes the carbonate more soluble in water and thereby quickens the action.

As the reaction in the container goes forward, the calcium carbonate is gradually converted into calcium chlorid which forms a heavy solution with the water present and the glycol formed, and in this heavy solution emulsification and efficient contact of the oily chlorids is comparatively easy. The container being closed, there is no loss of either chlorids or of glycol except in venting off, and this little may be recovered in the stated manner.

At the end of the reaction, with the quantities indicated, the oily chlorids and the calcium carbonate will have disappeared and there will remain a solution of calcium chlorid and the glycol formed. Only a limited amount of water having been used, there is usually no necessity of concentrating this liquor prior to recovering the glycol. It may be simply steamed out and the glycol blown over in a manner analogous to the recovery of glycerin. The distillate may be treated in the same manner as a glycerin distillate for concentration, it being borne in mind however that glycol is considerably more volatile with water vapor than is glycerin. The mixed glycols from oil gas olefins suffer less loss than pure ethylene glycol solutions. The calcium chlorid solution is particularly well adapted for the steaming operation. In lieu of steaming, of course vacuum distillation may be used; or currents of hydrogen, blue water gas, or other indifferent gas may be employed. But the steaming is simple and effective.

Any form of calcium carbonate, such as air slaked lime, ground chalk, precipitated carbonate of lime, etc., may be employed; but I find the precipitated carbonate the most reactive.

As the calcium chlorid exerts a facilitating action upon the glycol forming reaction, in making up a charge it is often desirable to use some of the mother liquor from a prior operation in lieu of part of the water. In concentrating the distillate after steaming, the water vapors volatilizing may advantageously be condensed and the condensate used in forming steam for steaming out or in lieu of water in making up a charge as this enables saving such glycol as may have volatilized therewith.

An advantageous method of operation is to concentrate the condensate from the steaming operation in a closed container, thereby obtaining a concentrated glycol, and to use the vapors from the concentrating apparatus in lieu of steam for steaming out a fresh finished charge.

In the stated operation using the dihalids from oil gas there results a mixture of ethylene and propylene, glycols, with some butylene glycols; a mixture which is desirable for use as such since for many purposes its properties are better than those of pure ethylene glycol. If the oily chlorids from the oil gas have been fractionated to recover pure ethylene dichlorid and propylene dichlorid separately, and the separate fractions then treated in the manner described, then the products will naturally be the pure glycols. If pure glycols are desired it is better to fractionate the halids than to try to separate the glycols after formation.

If the olefin bromids are used in lieu of the chlorids, the temperatures may be somewhat lower and the time of operation shorter, and the relative proportions must be changed. Using the mixed bromids from oil gas, a good proportion is one part calcium carbonate, two parts of mixed bromids and six to eight, or more, parts of water.

If I substitute calcium acetate, such as commercial "gray acetate" of lime, in the described operation I will produce glycol acetates. For example, I may mix 100 parts of the oily chlorids from the oil gas mentioned with 180–190 parts of commercial gray acetate and 350 to 500 parts of water and heat with agitation to 120 to 150° C. for three or four hours, or until a sample shows complete conversion of the oily chlorids. No $CO_2$ being produced in this reaction, venting off is not necessary. At the end of the reaction, the glycol acetate may be steamed off and recovered. If half the quantity of calcium acetate is employed a double chloracetate ester is produced. By using 90 parts of acetate, 50 parts of carbonate and 100 parts of oily chlorids, the monoacetates of the glycols are produced.

Other calcium salts of weak acids may be employed, such as lactate, butyrate, formate, borate, tartrate, etc., to obtain corresponding esters.

While strontium and barium salts may be used, they are not as desirable in the present invention as the calcium compounds for the reason that the barium and strontium chlorids and bromids do not have the desired physical relations to water of the corresponding calcium salts. On the other hand, salts of the remaining alkaline earth, magnesia may well be used since magnesium chlorid and bromid have the same desirable properties in this respect as the calcium salts. Dolomitic limestone may be used in preparing the carbonate used.

Zinc carbonate or oxycarbonate may be used as substitute for calcium carbonate as it also gives hygroscopic halid salts. Zinc chlorid however in concentrated solutions is a strong dehydrating agent and without care in operation, may damage the glycols, etc.

Addition of a little sodium sulfate to the reaction mixture quickens the reaction but has some incidental disadvantages.

The reaction mixtures described are all neutral and non-corrosive and the operations can be readily performed in iron, steel, or copper vessels.

If desired, the acetates can be first made in the present process and these then saponified with lime to give glycols, whereby calcium acetate is recovered for re-use.

At temperatures around 200° C. the reaction is much quicker, but with these high temperatures the amount of water present should be considerably increased and a more dilute glycol solution is obtained.

Another source of the halids for producing ethylene glycol and other ethylene esters under the present invention is calcium carbid. Carbid dust or waste or other form of carbid can be used to produce acetylene, this acetylene semi-hydrogenated to produce ethylene by hydrogen in the presence of catalysts such as copper, nickel, etc., (proper precautions being taken to restrain the reaction which otherwise may go to ethane), the ethylene chlorinated or brominated and the halid converted as previously described. This gives pure ethylene derivatives.

What I claim is:—

1. The process of converting olefin dihalids into useful products which comprises heating such dihalids under pressure in the presence of a liquid comprising water and of a salt of a weak acid and a base, such base being one which gives a hygroscopic halid salt.

2. The process of converting olefin dihalids into useful products which comprises heating such dihalids under pressure in the presence of a liquid comprising water and of a calcium salt of a weak acid.

3. The process of producing useful products which comprises heating halids of the olefins of oil gas under pressure in the presence of a liquid comprising water and of a salt of a weak acid and a base, such base being one which gives a hygroscopic halid salt.

4. The process of producing useful products which comprises heating halids of the olefins of oil gas under pressure in the presence of a liquid comprising water and of a calcium salt of a weak acid.

5. The process of producing useful products which comprises heating under pressure a mixture of olefin dihalids corresponding to the olefins of oil gas in the presence of a liquid comprising water and a calcium salt of a weak acid.

6. The process of producing useful products which comprises heating under pressure a mixture of olefin dihalids corresponding to the olefins of oil gas in the presence of a liquid comprising water and calcium acetate.

7. The process of producing useful products which comprises heating under pressure a mixture of olefin dihalids corresponding to the olefins of oil gas in the presence of a liquid comprising water and calcium acetate, such pressure being greater than that due to the temperature of the liquid so heated.

In testimony whereof, I affix my signature in the presence of two subscribing witnesses.

K. P. McELROY.

Witnesses:
 PERCY H. MOORE,
 HILDA SCHOENTHAL.